United States Patent
Yoshikawa

(10) Patent No.: US 9,405,370 B2
(45) Date of Patent: Aug. 2, 2016

(54) ELECTRONIC DEVICE AND CONTROL METHOD THEREOF

(71) Applicant: CANON KABUSHIKI KAISHA, Tokyo (JP)

(72) Inventor: Akio Yoshikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 14/281,605

(22) Filed: May 19, 2014

(65) Prior Publication Data

US 2014/0347296 A1 Nov. 27, 2014

(30) Foreign Application Priority Data

May 23, 2013 (JP) ................................. 2013-109388

(51) Int. Cl.
| | |
|---|---|
| G06F 3/0488 | (2013.01) |
| G06F 3/01 | (2006.01) |
| G06F 3/041 | (2006.01) |
| G06F 3/0485 | (2013.01) |

(52) U.S. Cl.
CPC ............... *G06F 3/016* (2013.01); *G06F 3/041* (2013.01); *G06F 3/0485* (2013.01); *G06F 3/04883* (2013.01); *G06F 2203/04104* (2013.01); *G06F 2203/04806* (2013.01); *G06F 2203/04808* (2013.01)

(58) Field of Classification Search
CPC ... G06F 3/04883; G06F 3/0488; G06F 3/044; G06F 3/045; G06F 3/0412
See application file for complete search history.

(56) References Cited

U.S. PATENT DOCUMENTS

| | | | | |
|---|---|---|---|---|
| 9,086,755 | B2 * | 7/2015 | Cho | G06F 3/0416 |
| 2007/0236450 | A1 * | 10/2007 | Colgate | G06F 3/016 345/156 |
| 2010/0013613 | A1 * | 1/2010 | Weston | G06F 3/041 340/407.2 |
| 2010/0079264 | A1 * | 4/2010 | Hoellwarth | G06F 3/041 340/407.2 |
| 2011/0216025 | A1 * | 9/2011 | Kurita | G06F 3/041 345/173 |
| 2011/0285653 | A1 * | 11/2011 | Kojima | G06F 3/016 345/173 |
| 2013/0215079 | A1 * | 8/2013 | Johnson | G06F 3/016 345/174 |
| 2014/0176455 | A1 * | 6/2014 | Araki | G06F 3/016 345/173 |
| 2014/0198069 | A1 * | 7/2014 | Park | G06F 3/016 345/173 |
| 2014/0210758 | A1 * | 7/2014 | Park | G06F 3/016 345/173 |
| 2014/0340328 | A1 * | 11/2014 | Kameyama | G06F 3/03545 345/173 |

FOREIGN PATENT DOCUMENTS

| | | |
|---|---|---|
| JP | 2008-065518 A | 3/2008 |
| JP | 2011-039989 A | 2/2011 |

* cited by examiner

*Primary Examiner* — Ricardo L Osorio
(74) *Attorney, Agent, or Firm* — Cowan, Liebowitz & Latman, P.C.

(57) ABSTRACT

An electronic device has an input device such as a touch panel that detects touching by an object, and performs operations that depend on a pattern of a detected touch input. The electronic device has a haptic feedback generator that generates stimulation that is perceivable by an object (e.g., finger) through a portion that is touching the input device. An acceptable operation method is notified to a user by controlling the haptic feedback generator to generate stimulation corresponding to a pattern of a touch input that is acceptable by the electronic device.

15 Claims, 13 Drawing Sheets

F I G. 2

| TOUCH OPERATION | EXEMPLARY TACTILE SENSATIONS PROVIDED WITH ELECTRICAL HAPTIC FEEDBACK GENERATION METHOD | EXEMPLARY TACTILE SENSATIONS PROVIDED WITH VIBRATION HAPTIC FEEDBACK GENERATION METHOD |
|---|---|---|
| TAP | SHORT TACTILE SENSATION IS PROVIDED TO CENTER OF TOUCHED SURFACE AND THEN TURNED OFF | ALL VIBRATION DEVICES VIBRATED ONCE FOR SHORT TIME |
| DOUBLE TAP | TAP TACTILE SENSATION IS REPEATED TWICE | TAP VIBRATION IS REPEATED TWICE |
| DIRECTIONAL FLICK (MOVE) | LOCAL TACTILE SENSATION THAT MOVES IN DESIRED MOVEMENT DIRECTION IS PROVIDED TO TOUCHE SURFACE (E.G., IN CASE OF RIGHTWARD FLICK, LOCAL TACTILE SENSATION IS PROVIDED FROM LEFT TO RIGHT OF TOUCHED SURFACE) | VIBRATION THAT IS STRONGER IN MOVEMENT DIRECTION IS PROVIDED TO PANEL (E.G., IN CASE OF RIGHTWARD FLICK, WEAK VIBRATION IS FIRST PROVIDED TO LEFT PORTION, FOLLOWED BY MODERATE VIBRATION TO CENTRAL PORTION & STRONG VIBRATION TO RIGHT PORTION) |
| ROTATE | POSITION TO WHICH TACTILE SENSATION IS LOCALLY PROVIDED IS MOVED TO RIGHT, LOWER, LEFT, UPPER, ETC. PORTIONS OF TOUCHED SURFACE | PORTION TO WHICH VIBRATION IS PROVIDED IS CHANGED FROM UPPER PORTION OF PANEL TO RIGHT, LOWER, LEFT, UPPER, ETC. PORTIONS |
| PINCH-IN | TACTILE SENSATION IS PROVIDED FROM LEFT/RIGHT PORTIONS OF TOUCHED SURFACE TOWARDS CENTER (PROVIDED TACTILE SENSATION CHANGES FROM 2 TO 1 POINT) | LEFT/RIGHT PORTIONS ARE VIBRATED FIRST, FOLLOWED BY CENTRAL PORTION |
| PINCH-OUT | TACTILE SENSATION IS PROVIDED FROM CENTER OF TOUCHED SURFACE TOWARDS LEFT/RIGHT PORTIONS (PROVIDED TACTILE SENSATION CHANGES FROM 1 TO 2 POINTS) | CENTRAL PORTION IS VIBRATED FIRST, FOLLOWED BY LEFT/RIGHT PORTIONS |
| DRAG | GRADUALLY STRONGER TACTILE SENSATION IS PROVIDED & MAINTAINED AFTER REACHING GIVEN STRENGTH | CONTINUOUS WEAK VIBRATE IS PROVIDED TO ENTIRE PANEL |

F I G. 3
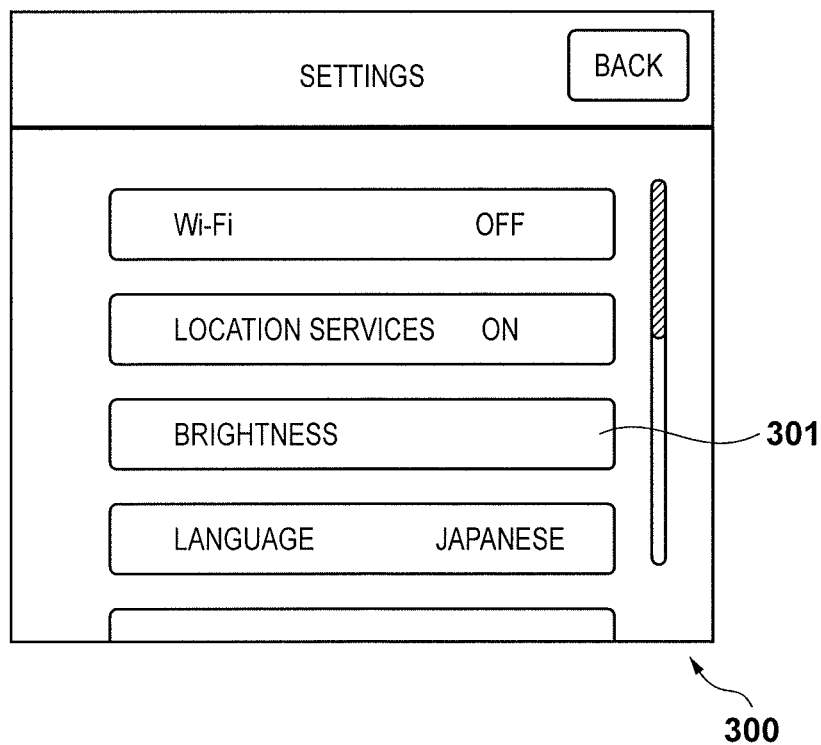

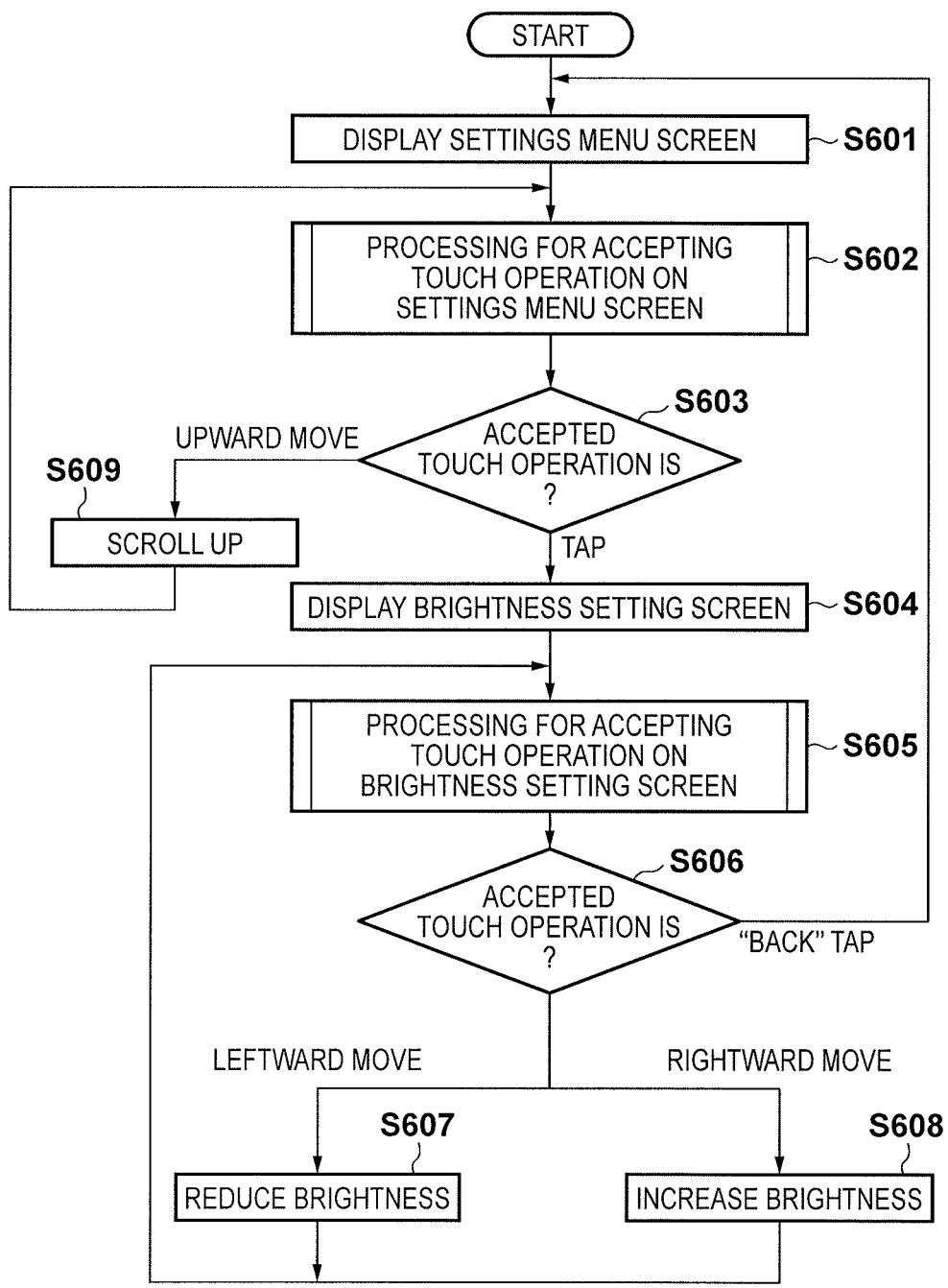

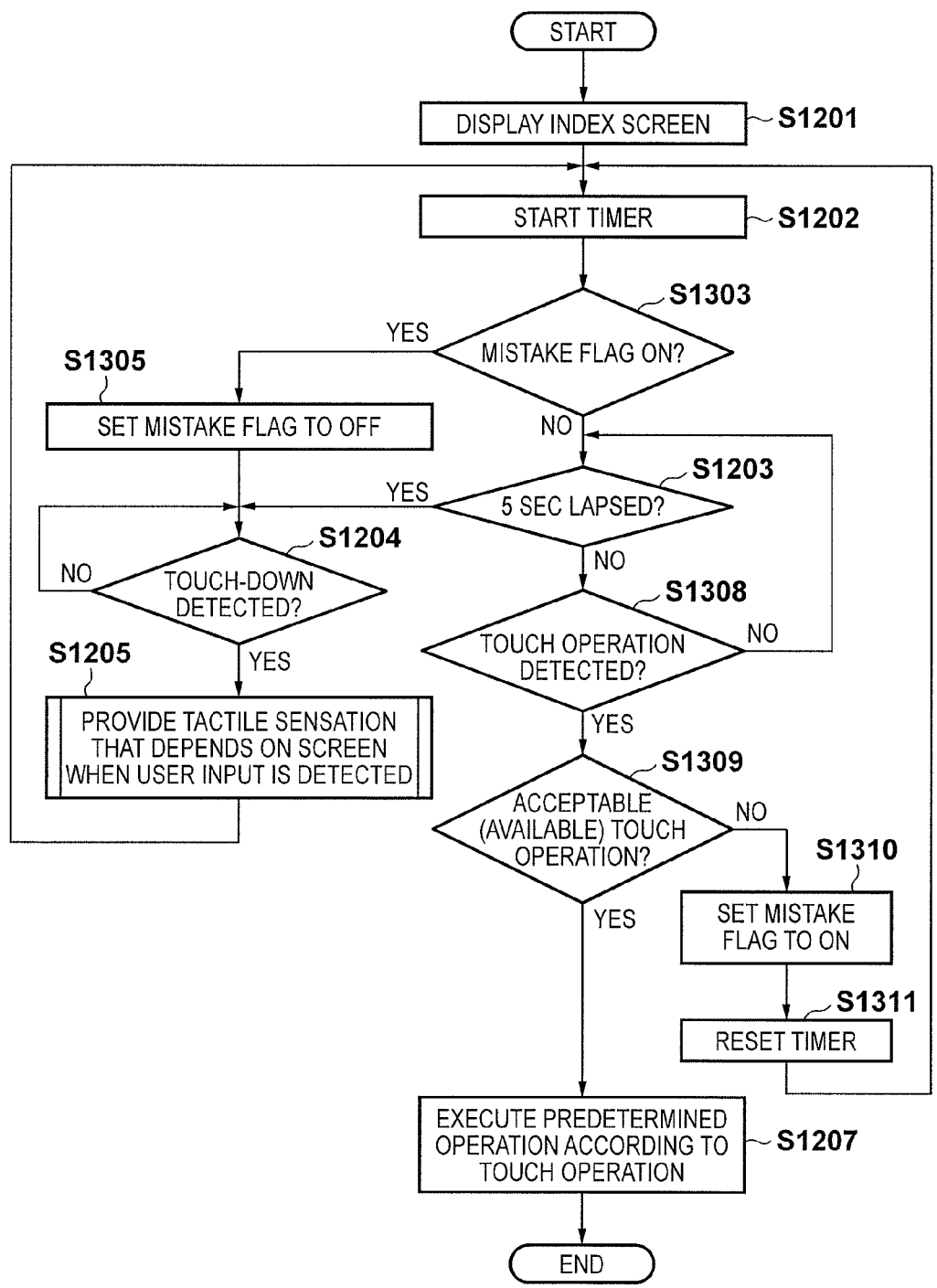

ELECTRONIC DEVICE AND CONTROL METHOD THEREOF

BACKGROUND OF THE INVENTION

1. Field of the Invention

The present invention relates to an electronic device and a control method thereof, and more particularly to an electronic device having an input device or the like capable of providing physical feedback and a control method thereof.

2. Description of the Related Art

Heretofore, graphical user interfaces (GUIs) have mainly been operated using input devices such as a keyboard and a mouse. Meanwhile, an increasing number of apparatuses enable GUIs such as button icons to be directly operated on the screen by providing a transparent touch panel on the screen, typical examples of which include smart phones and tablets.

Particularly in recent years, provision of operations that depend on the trace of input coordinates has also been carried out, in addition to simulating the pressing of buttons. Corresponding specific operations can thereby be executed by inputting a specific sign or gesture to the touch panel using a finger, a stylus or the like, for example.

An increasing number of apparatuses are also capable of receiving input of more complex gestures by using a touch panel capable of simultaneously recognizing a plurality of input coordinates. However, the user needs to remember the various input methods that are available. Also, since all the input methods cannot always be used, the user may not obtain the expected result from an operation and be left feeling annoyed. Accordingly, while it is desirable for the user to be able to grasp the input methods that are available on the current screen, usability is impaired with a method that involves looking up input methods on a so-called help screen or the like, and thus a more intuitive method is desirable.

Japanese Patent Laid-Open No. 2011-39989 proposes displaying guidance relating to candidate gesture operations available at that point in time, according to the trace of a touch input detected on the touch panel.

However, in the case of displaying information on available gesture operations in real time while the touch input is ongoing, as disclosed in Japanese Patent Laid-Open No. 2011-39989, space is needed for displaying information on gesture operations, and placing limits on the display layout. For example, when the guidance display is displayed by being superimposed on other display items, those other display items become difficult to see. Also, providing space for guidance display so that other display items are not hidden results in less space for displaying other display items, a decrease in the number of items that can be displayed, and a reduction in display size.

Also, even in the case where guidance display is displayed by being superposed or where a dedicated space is provided, the guidance display may possible be hidden by the finger or stylus carrying out the touch input. Although the use of methods other than display such as audio guidance, for example, is conceivable, there is concern that audio guidance could be a nuisance for anyone nearby, as well as possibly being difficult to hear in noisy places.

SUMMARY OF THE INVENTION

The present invention was made in view of such problems with the conventional technology, and provides an electronic device capable of notifying acceptable operation methods to the user by a method other than display or audio, and a control method thereof.

According to an aspect of the present invention, there is provided an electronic device comprising: an accepting unit configured to accept a touch operation on an input device; a processing unit configured to perform processing that depends on the touch operation accepted by the accepting unit; a generating unit configured to generate stimulation that is perceivable by a user who is touching the input device through a portion that is being touched; and a control unit configured to control the generating unit so as to generate stimulation corresponding to a pattern of a touch operation that is acceptable by the accepting unit.

According to another aspect of the present invention, there is provided a method controlling an electronic device having a generating unit configured to generate stimulation that is perceivable by a user who is touching an input device through a portion that is being touched, comprising the steps of: accepting a touch operation on the input device; performing processing that depends on the touch operation accepted in the acceptance step; and controlling the generating unit so as to generate stimulation corresponding to a pattern of a touch operation that is acceptable in the acceptance step.

Further features of the present invention will become apparent from the following description of exemplary embodiments with reference to the attached drawings.

BRIEF DESCRIPTION OF THE DRAWINGS

FIG. 2 is a diagram showing exemplary patterns of tactile sensations generated by a haptic feedback generator according to the type of touch operation (operation method), in the electronic device according to the embodiment of the present invention.

FIG. 3 is a diagram showing an exemplary settings menu screen that is displayed on the electronic device according to the embodiment of the present invention.

FIG. 6 is a flowchart for illustrating processing by a CPU in relation to a touch operation in an electronic device according to a first embodiment of the present invention.

FIG. 13 is a flowchart for illustrating processing by a CPU in relation to a touch operation in an electronic device according to a fourth embodiment of the present invention.

DESCRIPTION OF THE EMBODIMENTS

Exemplary embodiments of the present invention will now be described in detail in accordance with the accompanying drawings.

First Embodiment

Figure 1:
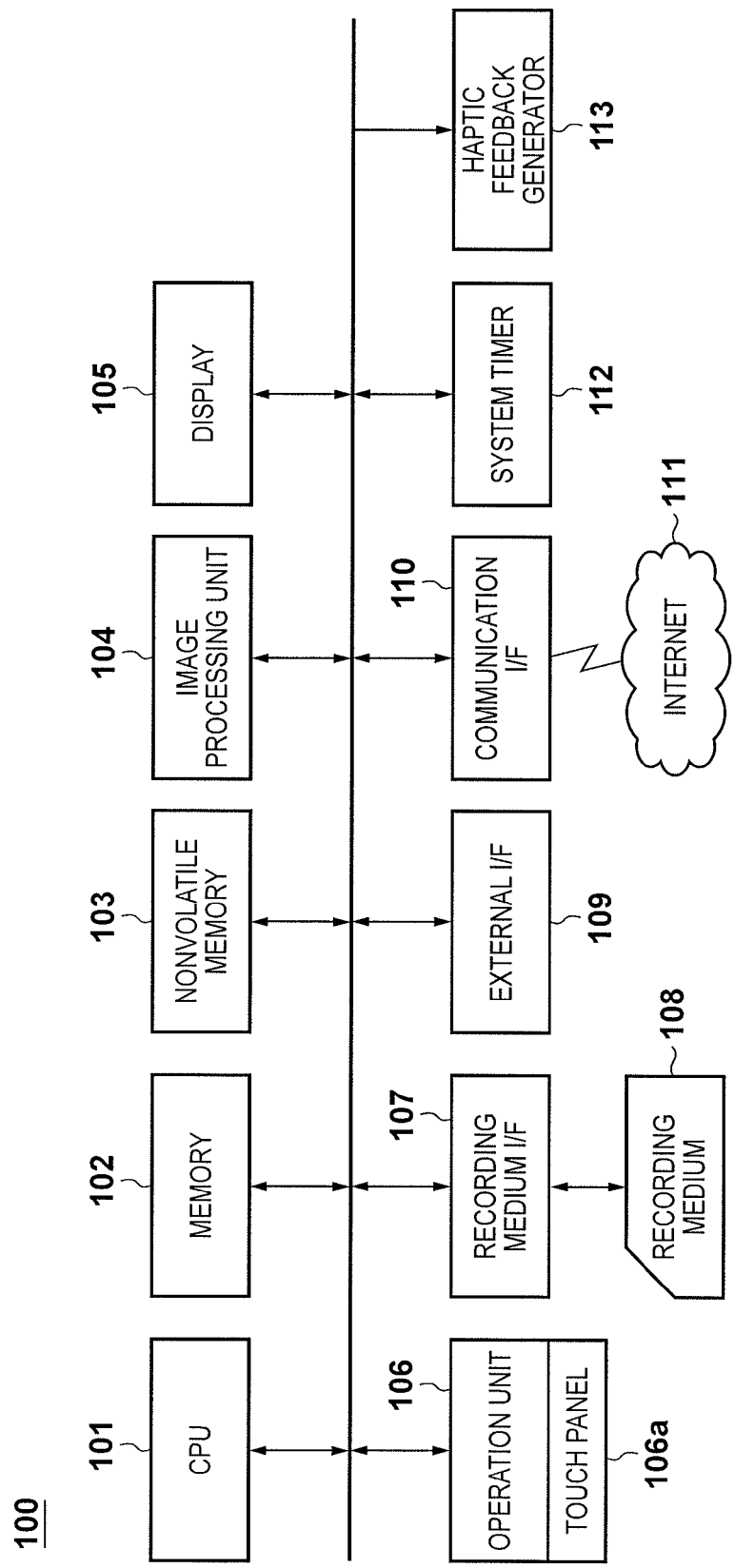
FIG. 1 is a block diagram showing an exemplary functional configuration of an electronic device according to an embodiment of the present invention.

FIG. 1 is a block diagram showing an exemplary functional configuration of an electronic device 100 according to a first embodiment of the present invention. The electronic device 100 to which the present invention is applicable may be any device that is provided with a touch-sensitive input device such as a touch panel, and, more particularly, the present invention can be suitably applied to electronic devices in which a touch panel is disposed on a display apparatus, such as mobile phones, handheld game machines and tablets. Moreover, the present invention is applicable not only to portable devices but also to copiers, printers, home electronics and the like. FIG. 1 shows an exemplary functional configuration with which an electronic device to which the present invention is applicable is considered to be typically provided.

A CPU 101, a memory 102, a nonvolatile memory 103, an image processing unit 104, a display 105, an operation unit 106, a recording medium I/F 107, an external I/F 109, a communication I/F 110, a system timer 112 and a haptic feedback generator 113 are connected to an internal bus 150. These components that are connected to the internal bus 150 are capable of transmitting and receiving data with each other via the internal bus 150.

The memory 102 consists of a RAM (volatile memory utilizing a semiconductor device, etc.), for example. The CPU 101 realizes the operations of the electronic device 100 which will be discussed later, by controlling the components of the electronic device 100 in accordance with programs stored in the nonvolatile memory 103, for example, using the memory 102 as a work memory. The nonvolatile memory 103 stores image data, audio data and other data, various programs that are executed by the CPU 101, and the like. The nonvolatile memory 103 can be constituted by a hard disk drive (HDD), a solid-state drive (SSD), a ROM (including rewritable ROM such as EEPROM), or the like.

The image processing unit 104 performs various image processing on image data stored in the nonvolatile memory 103 or a recording medium 108, video signals acquired via the external I/F 109, image data acquired via the communication I/F 110, and the like, under the control of the CPU 101. The image processing that is performed by the image processing unit 104 includes A/D conversion, D/A conversion, encoding of image data, compression, decoding, enlargement/reduction (resizing), noise reduction, color conversion and the like. The image processing unit 104 may be constituted by dedicated circuit blocks for performing specific image processing. Also, at least some of image processing may be realized by the CPU 101 executing an image processing program, rather than using the image processing unit 104.

The display 105 displays GUI (Graphical User Interface) images and the like that are used by application programs and the OS, apart from images, text and the like recorded on the recording medium 108, for example, under the control of the CPU 101. The CPU 101 controls the various components of the electronic device 100 so as to generate video signals for displaying on the display 105 in accordance with a program and output the video signals to the display 105. The display 105 displays images based on the output video signals. Note that a configuration may be adopted in which the display 105 is an external apparatus, and the electronic device 100 outputs video signals for display on the display 105.

The operation unit 106 is an input device for accepting user operations, and includes a text information input device such as a keyboard, a pointing device such as a mouse or a touch panel 106a, buttons, dials, a joy stick, a touch sensor, and a touchpad. Also, the surface of the input device that is capable of detecting touch operations is called a touch-sensitive surface. Note that, in the present embodiment, the touch panel 106a is transparent or translucent and is disposed on the display screen of the display 105 such that the display screen is visible, but may be opaque and disposed in different position to the display 105. Also, the touch panel 106a outputs the coordinate information of touch inputs, with the relationship between the coordinate information output by the touch panel 106a and the display coordinates of the display 105 being well-known. The touch panel 106a may be of a type that, in the case where inputs are simultaneously received with respect to a plurality of different positions, is capable of outputting coordinate information for the individual inputs, or may be of a type that outputs only coordinate information for one input.

Any touch panel employing one of various well-known methods, such as a resistive method, a capacitive method, a surface acoustic wave method, an infrared method, an inductive method, an image recognition method or an optical sensor method, can be used for the touch panel 106a.

The recording medium I/F 107 performs reading out and writing of data with respect to a removable recording medium 108 such as a memory card, CD or DVD, under the control of the CPU 101. The external I/F 109 is an interface for performing input and output of video signals and audio signals with respect to an external apparatus that is connected by cable or wireless. The communication I/F 110 is an interface for communicating with an external apparatus, the Internet 111 or the like, and performing transmission and reception of various data such as files and commands.

The system timer 112 measures time for use in various controls and the time of a built-in clock.

In the present embodiment, the CPU 101 is able to detect the following operations/states with respect to the touch panel 106a.

An object touches the touch panel 106a (hereinafter, "touch-down").

A state where an object is touching the touch panel 106a (hereinafter, "touch-on").

Movement of the touch position while the object remains in contact with the touch panel 106a (movement of the touch position while in a touch-on state; hereinafter, "move").

Transition from a state where an object is touching the touch panel 106a to a non-touching state (hereinafter, "touch-up").

A state where the touch panel 106a is not being touched (hereinafter, "touch-off").

Touch-on at two points simultaneously and narrowing of the distance between the two points that are being touched (hereinafter, "pinch-in").

Touch-on at two points simultaneously and widening of the distance between the two points that are being touched (hereinafter, "pinch-out").

Also, a touch-down and a touch-up at a plurality of points will be referred to hereinafter as a "multi-touch-down" and a "multi-touch-up", respectively. Also, an operation at a plurality of points and a touch-on at a plurality of points will be referred as a "multi-touch" and a "multi-touch-on", respectively. The information relating to states and operation of the touch panel 106a and the coordinates of positions where an object (generally user's finger or stylus pen) touches the touch panel 106a are notified to the CPU 101 through the internal bus 150. The CPU 101 determines what kind of operation was performed on the touch panel 106a, based on the notified information.

With regard to move, the CPU 101 is able to determine the movement direction (movement direction of touch point) of a finger or pen that moves while remaining in contact with the touch panel 106a, separately for the vertical component and the horizontal component of the touch panel 106a, based on the change in the position coordinates.

In the present embodiment, a series of states and specific patterns that are detectable by the touch panel 106a are regarded as touch operations. For example, a continuous change in the state of the touch panel 106a from touch-down to touch-on, move and then touch-up is regarded as a touch operation known as stroke drawing. A quick stroke drawing operation is also called a flick. A flick is an operation that involves touching the touch panel, quickly moving a certain distance while remaining in contact with the touch panel, and then releasing the contact, and can be described as an operation involving quickly tracing over the touch panel with a flick-like gesture of a finger. It can be determined that a flick operation has been performed when a move over a predetermined distance or more at a predetermined speed or faster is detected, followed directly by a touch-up. Also, a move of less than the predetermined speed will be determined to be a normal move operation. Also, the correspondence of other touch operations with the patterns of states of the touch panel 106a mentioned above is assumed to be registered in advance in the nonvolatile memory 103. For example, detection of a touch-off within a predetermined time period after a touch-down is regarded as a tap operation, and detection of a touch-off on or after the predetermined time period is not regarded as a tap operation.

The haptic feedback generator 113 is a device for providing mechanical or electric feedback (stimulation) from the touch panel 106a (through the touch-sensitive surface) to an object (e.g., user's finger(s), stylus held by the user, etc.) that is touching the touch panel 106a. In the case where the object is a living body such as a finger or is held by a living body, mechanical or electrical feedback can be perceived as a tactile sensation (or a change thereof) by the sense of touch of the living body. Known haptic feedback generation methods include a vibration haptic feedback generation method and an electrical haptic feedback generation method, and at least one of these methods can be used for the haptic feedback generator 113 (a combination thereof may also be used).

In the case where the vibration haptic feedback generation method is used, eccentric motors or piezoelectric elements (these being equivalent to the haptic feedback generator 113) are respectively disposed on an upper portion, a lower portion, a left portion, a right portion, and a central portion of the back surface of the display 105 (touch panel 106a). By controlling the current flowing to each motor or the voltage applied to each piezoelectric element, a specific portion of the display 105 (touch panel 106a) is vibrated (i.e., vibration stimulation is generated). By controlling the current flowing to the motors or the voltage applied to the piezoelectric elements with the CPU 101, it is possible to generate various types of vibrations at different portions, and to provide various tactile sensations to the user who touches the touch panel 106a.

The haptic feedback generator 113 employing the electrical haptic feedback generation method consists of a conductive layer panel and an insulator panel, and is able to charge the conductive layer with positive charge. These two panels are disposed by being overlaid on the display 105 similarly to the touch panel 106a, and electrical stimulation can be applied when the user touches the insulator panel by the positive charge with which the conductive layer panel is charged. Also, it is possible to provide the sense of the skin being pulled by a Coulomb force.

Each position of the conductive layer panel can be selectively charged with a positive charge, and by the CPU 101 controlling selection, the sense of a virtual coarse surface, the sense of virtual bumps (a rougher tactile sensation than the sense of a virtual coarse surface) and the like can be provided to the user's finger(s) or the like touching the touch panel 106a. Also, by selectively charging each position of the conductive layer panel with a positive charge, it is possible to provide tactile sensations locally rather than to the whole area being touched and to also change the position to which a tactile sensation is provided within one touched surface, enabling a variety of tactile sensations to be provided to the user.

In the first embodiment, the electronic device 100 generates a tactile sensation according to the type of touch operation that is currently acceptable. The user is thereby able, when he or she is touching the touch panel 106a with a finger (or with a stylus that he or she is holding), for example, to find out what type of touch operation can currently be used from the tactile sensation of the finger (directly or through the stylus).

FIG. 2 is a diagram showing exemplary patterns of tactile sensations generated by the haptic feedback generator 113 according to the type of touch operation (operation method), in the case where the vibration haptic feedback generation method is employed and in the case of the electrical haptic feedback generation method is employed. In this way, information indicating the correspondence between operation methods and patterns of tactile sensations for notifying the operation methods is recorded in the nonvolatile memory 103. Note that since the stored information is in practice referred to by a program, this information may take the form of a table in which the types of tactile sensation patterns and the types of operation methods are associated after having been coded.

FIG. 3 is a diagram showing an exemplary settings menu screen of the electronic device 100 that is displayed on the display 105. A settings menu screen 300 contains button images respectively corresponding to a plurality of setting items, and when a touch input is detected, the screen transitions to the setting screen of the item represented by the button image corresponding to the position that was touched. In the following description, detection of the touch panel 106a being touched at a position corresponding to an operable GUI object such as a button image may be expressed simply as "button has been touched".

Also, when a drag or flick operation in the vertical direction is detected in the case where the settings menu screen 300 is vertically larger than the display 105, the CPU 101 scrolls display of the settings menu screen in a direction corresponding to the operation direction. The user is thereby able to display button images that were not displayed. Note that in the followings, unless otherwise specified, the direction of scroll refers to the directions that the displayed content moves in the window, not the direction that the window moves relative to the displayed content. For example, scrolling "up" causes the displayed content to move in upward direction so that new content appears from the bottom of screen and that the content that was displayed at the top of the screen disappears.

Figure 4A:
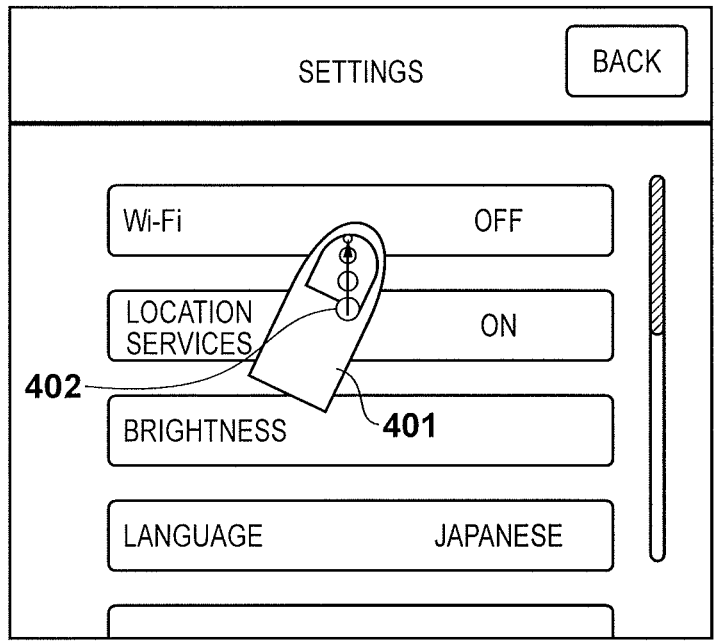
FIG. 4A is a diagram schematically showing an exemplary way of providing a tactile sensation for a move operation.

In other words, the electronic device 100 is capable of accepting at least a tap operation, a flick operation and a drag operation when the settings menu screen 300 shown in FIG. 3 is displayed. When there is a touch-on in a state where the settings menu screen is displayed, the CPU 101 causes the haptic feedback generator 113 to generate a tactile sensation corresponding to a move operation to the vertical direction. For example, in accordance with the correspondence table of FIG. 2, a tactile sensation that moves in an upward direction is provided, as shown in FIG. 4A, to a finger 401 by providing a tactile sensation 402 in an upward direction with a plurality of positions within a predetermined range centered on the position of the touch-on. In FIG. 4A, the positions where the tactile sensation is provided are shown with circles and the arrow indicates the temporal change in position. The user is thereby able to recognize from the tactile sensation what type of touch operation is currently possible, by touching the touch panel 106a for a short time. Note that as long as the user is able to feel the tactile sensation moving in an upward direction, the size and position of the tactile sensation provided by the haptic feedback generator 113 can be arbitrarily set. For example, by gradually increasing the strength of the tactile sensation together with moving the position at which the tactile sensation is provided in an upward direction, various movement patterns can be employed to emphasize directionality or the like.

Note that, as mentioned above, the tactile sensation patterns are associated with the types of touch operations (operation methods). Thus, if the acceptable operation methods are in common, the tactile sensations provided to the user by the haptic feedback generator 113 will also be in common, irrespective of the display contents of the screen or the operational state of the electronic device. Also, if the user is currently in the middle of performing some sort of operation, for example, an operation method that is acceptable after the end of the operation currently being performed is notified by a tactile sensation.

Figure 5A:
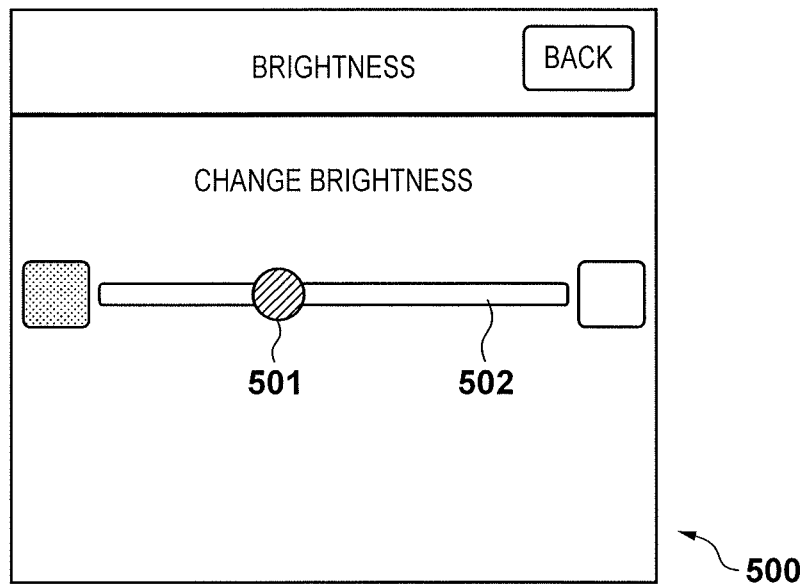
FIG. 5A is a diagram showing an exemplary brightness setting screen that is displayed when a brightness button is tapped on the settings menu screen shown in FIG. 3.

FIG. 5A shows an exemplary brightness setting screen that the CPU 101 displays on the display 105, in the case where a brightness button 301 is touched in the state of FIG. 3. A brightness setting screen 500 contains a slider 501 as an operable GUI object. The CPU 101 changes the display position of the slider 501 along a bar 502 according to a drag operation of the slider 501, and changes screen luminosity according to the position of the slider 501. That is, on the brightness setting screen 500, an acceptable operation in a state where the slider 501 is touched is a move operation in the horizontal direction.

Figure 5B:
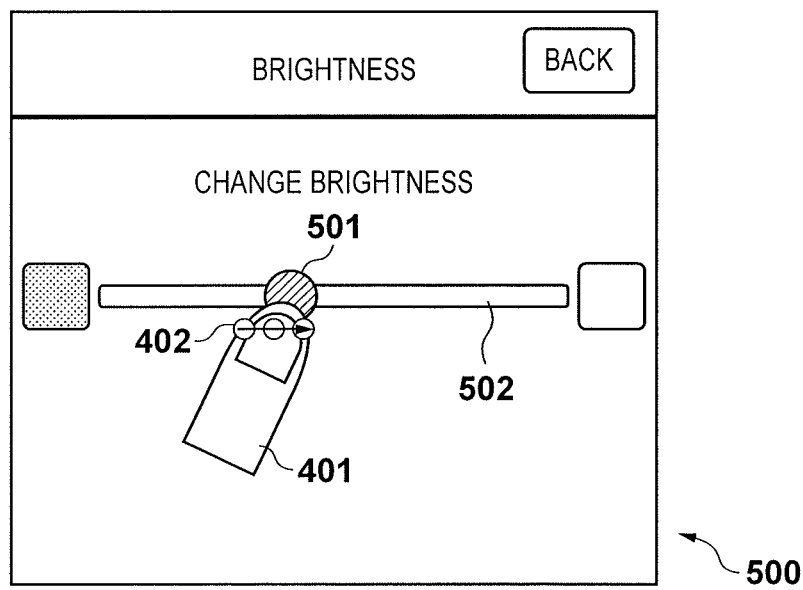
FIG. 5B is a diagram schematically showing an exemplary way of providing a tactile sensation for a move operation of a slider in FIG. 5A.

Accordingly, the CPU 101 causes the haptic feedback generator 113 to generate a tactile sensation for notifying a move operation in the horizontal direction when the slider 501 is touched for a predetermined time period or longer (touch-on) during display of the brightness setting screen 500. For example, in accordance with the correspondence table of FIG. 2, tactile sensations are sequentially generated, as shown in FIG. 5B, at a plurality of positions from left to right within a nearby area centered on the touch position. The user is thereby able to recognize, when touching the slider 501, that an operation of dragging the slider 501 horizontally is possible from the tactile sensation.

Processing by the CPU 101 in the case where the brightness button 301 is touched during display of the settings menu screen 300 shown in FIG. 3 and an operation for changing the brightness is performed on the brightness setting screen 500 of FIG. 5A, as mentioned above, will be described using the flowchart shown in FIG. 6. The control operation shown in the flowchart of FIG. 6 is implemented by a program stored in the nonvolatile memory 103 being expanded in the memory 102 and executed by the CPU 101. The processing of FIG. 6 is started by the operation unit 106 being operated and an instruction to display the settings menu being input.

At S601, the CPU 101 displays the settings menu screen 300 of FIG. 4A on the display 105, by generating a video signal for display based on data of the settings menu screen 300 stored in the nonvolatile memory 103, and outputting this video signal to the display 105. Note that in the case where a GUI object is displayed, reading out of the GUI object, generation of a video signal based on the read out GUI object data, and output control of the generated video signal to the display 105 are performed. Hereinafter, however, a simplified description in which the CPU 101 is described as displaying the settings menu screen on the display 105 will be given in some cases to avoid complicating the description.

At S602, the CPU 101 performs processing for accepting a touch operation on the displayed settings menu screen. Details of this processing will be discussed later using FIG. 7.

At S603, the CPU 101 discriminates the type of touch operation accepted in the touch operation acceptance processing, and advances the processing to S609 in the case where an upward flick (move) operation was accepted and to S604 in the case where a tap operation was accepted.

Figure 4B:
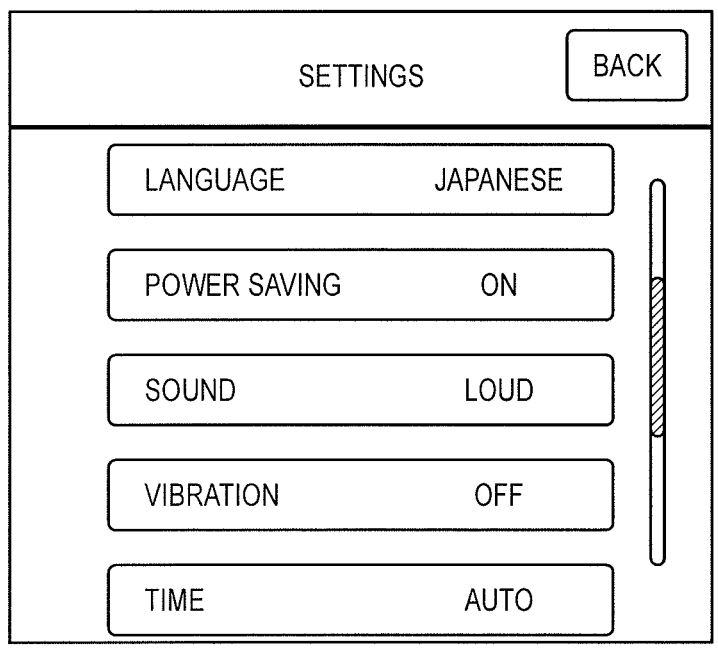
FIG. 4B is a diagram showing an exemplary screen display after an upward move operation has been carried out in the state of FIG. 3.

At S609, the CPU 101 scrolls display of the settings menu screen 300 up by an amount that depends on the distance of the move or the speed of the flick, and returns the processing to S602. An exemplary display state after scrolling is shown in FIG. 4B.

At S604, the CPU 101 displays a settings screen that depends on the GUI button tapped on the display. As mentioned above, for convenience of describing the processing relating to the brightness adjustment operation here, the brightness settings screen 500 is displayed on the display 105 as shown in FIG. 5A, assuming that a tap operation on the brightness button 301 has been accepted. In practice, however, subsequent processing branches according to which of the GUI buttons currently being displayed is tapped.

When the brightness settings screen 500 shown in FIG. 5A is displayed on the display 105, the CPU 101 executes the processing of S605 for accepting a touch operation on the brightness settings screen. Details of this processing will be discussed later using FIG. 8.

At S606, the CPU 101 discriminates the touch operation accepted in the touch operation acceptance processing on the brightness settings screen, and advances the processing to S607 if a leftward move operation was accepted and to S608 if a rightward move operation was accepted. Also, if the Back button is tapped, the CPU 101 returns the processing to S601 and displays the settings menu screen 300 (FIG. 3) on the display 105 again.

At S607, the CPU 101 moves the display position of the slider 501 according to the amount of the move operation, and reduces the luminosity of the display 105, before returning the processing to S605.

At S608, the CPU 101 moves the display position of the slider 501 according to the amount of the move operation and increases the luminosity of the display 105, before returning the processing to S605.

Figure 7:
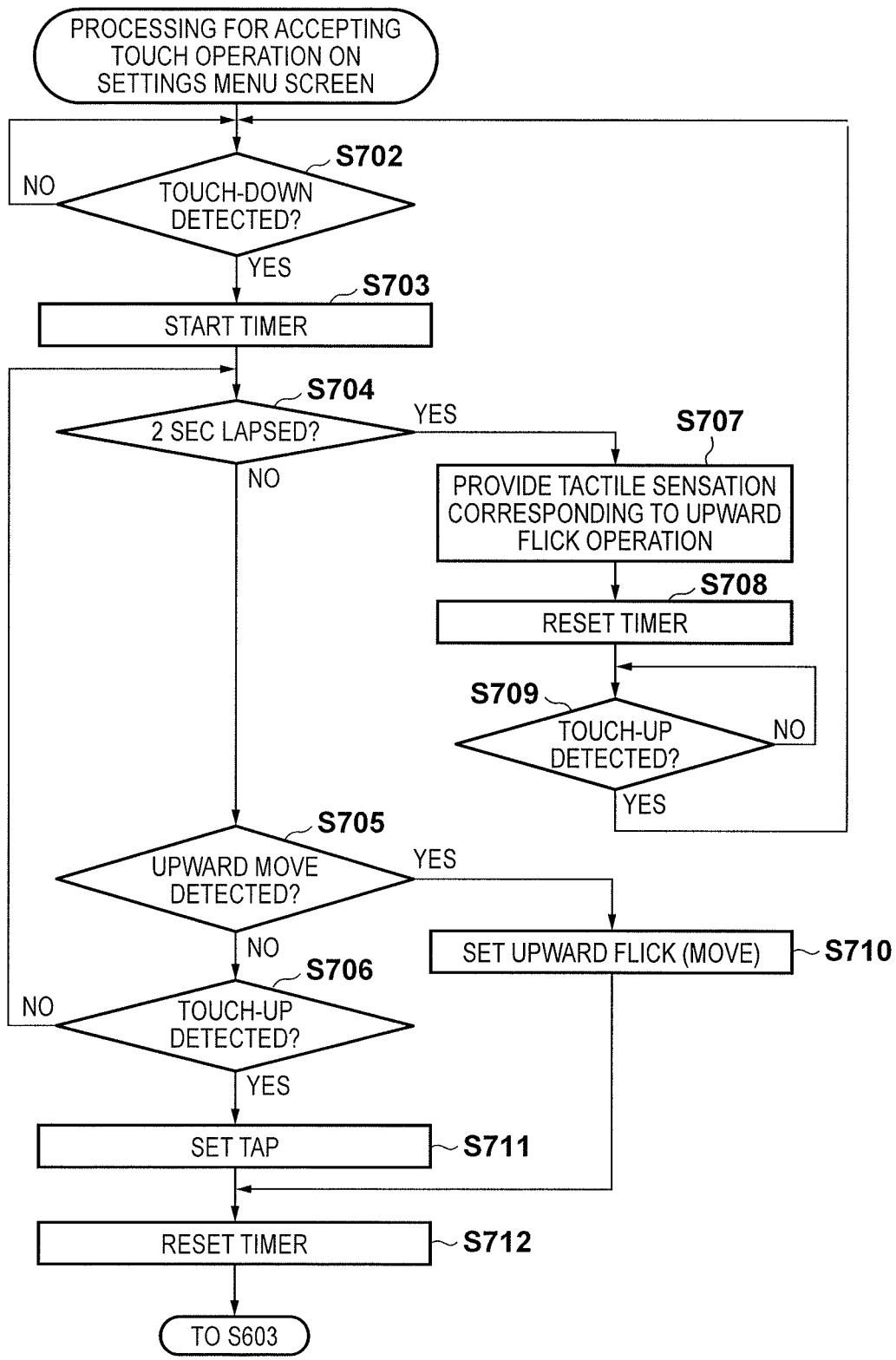
FIG. 7 is a flowchart for illustrating details of touch operation acceptance processing in S602 of FIG. 6.

Next, details of the processing for accepting a touch operation on the settings menu screen in S602 of FIG. 6 will be described using the flowchart of FIG. 7.

At S702, the CPU 101 discriminates whether a touch-down state was detected.

At S703, the CPU 101 starts the system timer 112, in order to measure the duration of the touch-down state. Note that in the case where the system timer 112 is always operating, counting of the output value of the system timer 112 is started.

At S704, the CPU 101 distinguishes whether a predetermined time period (here, 2 sec) has lapsed from when time measurement was started, and advances the processing to S707 if 2 seconds or more have lapsed and to S705 if 2 seconds have not lapsed. The processing transitions to S707 in the case where an upward move state (only the upward move state is considered for convenience, since scrolling down is not possible from the display state of FIG. 3) and a touch-up state are not detected for 2 seconds or more after the touch-down state was detected.

Thus, in the present embodiment, when a touch-on state continues for a predetermined time period after a touch-down is detected without an acceptable touch operation being accepted, an operation that is acceptable at the point in time is notified by a tactile sensation. Note that not all acceptable touch operations need be notified by tactile sensations. For example, operations that the user will comprehend as being acceptable without being notified, such as the GUI button accepting a tap operation, may be excluded from being notified by a tactile sensation. A situation where the user feels put out by all manner of operations being notified by tactile sensations or ultimately loses track of what operations are available can thereby be prevented. Also, a configuration may be adopted in which the types of touch operations notified by tactile sensations are touch operations that are acceptable with respect to the GUI object corresponding to the position at which a touch-on was detected. For example, a configuration may be adopted in which, in the case where a plurality of GUI objects exist on the screen (including the background) and the acceptable operations differ for each object, only the touch operation acceptable at the position where the touch-on was detected is notified with a tactile sensation.

At S707, the CPU 101 controls the haptic feedback generator 113 as described in the table of FIG. 2, so as to provide a tactile sensation corresponding to an upward flick operation to the user's finger touching the touch panel 106a. Note that a configuration can be adopted in which, in the case where both upward and downward flick operations are acceptable, a tactile sensation corresponding to an upward flick operation and a tactile sensation corresponding to a downward flick operation are provided alternately.

At S708, the CPU 101 stops the system timer 112 or the counting operation thereof started at S703, and resets the timer (stops the timer after resetting it to 0).

At S709, the CPU 101 discriminates whether a touch-up was detected, and repeats the processing from S702 when a touch-up is detected. If a touch-up is not detected, the CPU 101 waits until a touch-up is detected. Note that a configuration may be adopted in which the processing returns to S703 if a touch-up is not detected for a predetermined time period. The user is thus able to instruct scrolling by moving the finger that is touching the touch panel upward after feeling the tactile sensation.

At S705, the CPU 101 discriminates whether an upward move state was detected, and, if detected, advances the processing to S710, sets information indicating that an upward flick operation has been accepted as the acceptance processing result, and advances the processing to S712. In the case where an upward move state is not detected, the CPU 101 advances the processing to S706, and distinguishes whether a touch-up was detected.

The CPU 101 returns the processing to S704 if a touch-up is not detected in S706. If a touch-up is detected, the CPU 101 advances the processing to S711, sets information indicating that a tap operation has been accepted as the acceptance processing result, and advances the processing to S712.

At S712, the CPU 101 resets the timer similarly to S708 and advances to S603 of FIG. 6.

Figure 8:
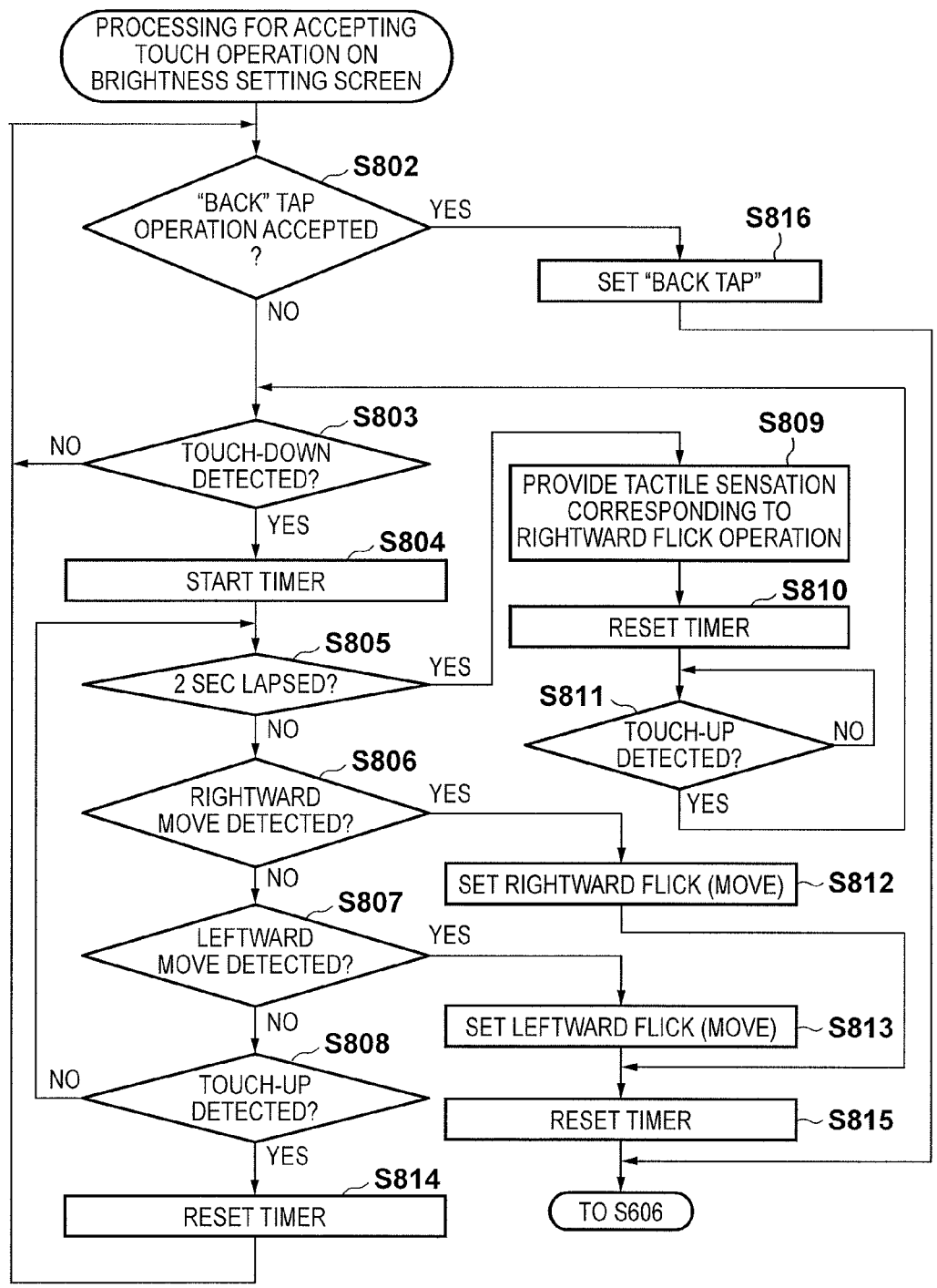
FIG. 8 is a flowchart for illustrating details of touch operation acceptance processing in S605 of FIG. 6.

Next, details of the processing for accepting a touch operation on the brightness settings screen in S605 of FIG. 6 will be described using the flowchart of FIG. 8.

At S802, the CPU 101 discriminates whether the Back button was tapped, and, if tapped, advances to S816, sets information indicating that "back" has been tapped as the processing result, and ends the touch operation acceptance processing (transitions the processing to S606).

In S802, if a tap operation of the Back button has not been accepted, the CPU 101 advances the processing to S803.

At S803, the CPU 101 discriminates whether a touch-down state has been detected. Note that, in the present embodiment, since the only GUI object that is operable on the brightness settings screen 500 apart from the Back button is the slider 501, it may be determined whether a touch-down state has been detected in an area corresponding to the slider 501.

At S804, the CPU 101 starts the system timer 112, in order to measure the duration of the touch-down state. Note that in the case where the system timer 112 is always operating, counting of the output value of the system timer 112 is started.

At S805, the CPU 101 distinguishes whether a predetermined time period (here, 2 sec) has lapsed from when time measurement was started, and advances the processing to S809 if 2 seconds or more have lapsed and to S806 if 2 seconds have not lapsed. The processing transitions to S809 in the case where a horizontal move state and a touch-up state are not detected for 2 seconds or more after the touch-down state was detected.

Thus, in the present embodiment, an operation that is acceptable at that point in time is notified by a tactile sensation, in response to the touch input to the touch panel 106a having met a predetermined condition. Here, as one example, the continuation of the touch-on state for a predetermined time period (2 sec) from when touch-down was detected without an acceptable touch operation being accepted was used as the condition, but other conditions may be used. Also, the condition may be changed according to the situation.

At S809, the CPU 101 controls the haptic feedback generator 113 as described in the table of FIG. 2, so as to provided a tactile sensation corresponding to a rightward flick operation to the user's finger touching the touch panel 106a. Note that a configuration can be adopted in which, in the case where both rightward and leftward flick operations are acceptable, as shown in FIG. 5B, a tactile sensation corresponding to a rightward flick operation and a tactile sensation corresponding to a leftward flick operation are provided alternately. A configuration may also be adopted in which, in the case where the slider 501 is at the right or left end and can only move one way, only a tactile sensation corresponding to a flick operation in the direction in which the slider can move is provided.

At S810, the CPU 101 stops the system timer 112 or the counting operation thereof started at S804, and resets the timer (stops the timer after resetting it to 0).

At S811, the CPU 101 discriminates whether a touch-up has been detected, and repeats the processing from S803 when a touch-up is detected. If a touch-up is not detected, the CPU 101 waits until a touch-up is detected. Note that a configuration may be adopted in which the processing returns to S804 if a touch-up is not detected for a predetermined time period.

At S806, the CPU 101 discriminates whether a rightward move state has been detected, and, if detected, advances the processing to S812, sets information indicating that a rightward flick operation has been accepted as the acceptance processing result, and advances the processing to S815. If a rightward move state is not detected, the CPU 101 advances the processing to S807 and distinguishes whether a leftward move state has been detected. In the case where a leftward move state is detected, the CPU 101 advances the processing to S813, sets information indicating that a leftward flick operation has been accepted as the acceptance processing result, and advances the processing to S815. At S815, the CPU 101 resets the timer similarly to S810, and advances to S603 of FIG. 6.

In the case where a rightward or leftward move state is not detected at S806 or S807, the CPU 101 advances the processing to S808 and distinguishes whether a touch-up has been detected.

The CPU 101 returns the processing to S805 if a touch-up is not detected in S808. In the case where touch-up is detected, the CPU 101 advances the processing to S814, resets the timer similarly to S810, and returns the processing to S802.

According to the present embodiment as described above, a configuration is adopted in which acceptable touch operations are conveyed to the user by tactile sensations. Thus, problems such as display being hidden by a finger or the stylus or other objects being hidden by guidance display, as in the case where guidance display is performed, do not occur. Also, a dedicated display area does not need to be provided. Furthermore, problems that arise in the case of using audio guidance also do not occur.

Also, a configuration may be adopted in which notification by a tactile sensation is performed at the point in time at which an acceptable touch operation has not been detected for a given time period, rather than immediately after a touch-down is detected. Thus, usability is improved since a user who comprehends what kinds of touch operations are available is able to carry out a desired touch operation without being notified by a tactile sensation. On the other hand, usability is also improved in terms of the fact that the user is able to obtain notification by a tactile sensation simply by continuing to touch the touch panel in the case where he or she does not know what operations are available.

Second Embodiment

Next, a second embodiment of the present invention will be described. In the present embodiment, a specific example will be described in which notification by a tactile sensation is given when a plurality of touch operations are acceptable. Note that in order to facilitate description and understanding, the functional configuration of the electronic device according to the present embodiment and the correspondence relationship between touch operations and tactile sensations are assumed to be similar to the first embodiment.

Figure 9A:
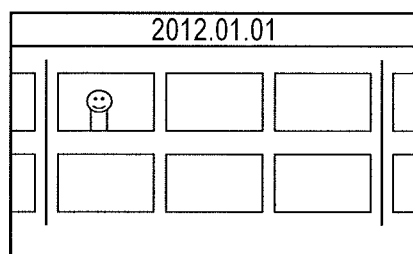
FIGS. 9A to 9F are diagrams showing an exemplary index screen that display a list of image data saved in a recording medium of FIG. 1, and exemplary screen transitions according to touch operations on the index screen.

FIG. 9A shows an index screen as an exemplary screen that displays a list of image data saved in the recording medium 108. It is assumed that the electronic device 100 of the present embodiment is capable of accepting a plurality of touch operations such as a leftward or rightward flick (move), a tap, a pinch-in and a pinch-out, when the index screen is displayed on the display 105.

Figure 9B:
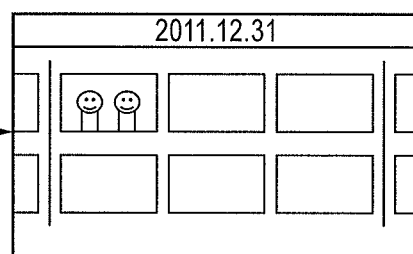
Figure 9C:
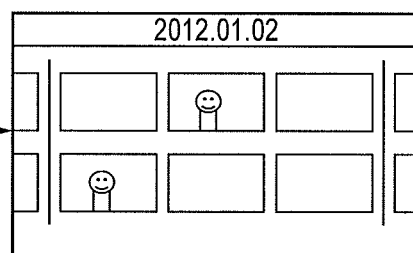

FIGS. 9B to 9F show exemplary screen changes in the case where each of the acceptable touch operations are performed on the index screen shown in FIG. 9A. FIG. 9B corresponds to a rightward flick, FIG. 9C corresponds to a leftward flick, FIG. 9D corresponds to a tap, FIG. 9E corresponds to a pinch-in, and FIG. 9F corresponds to a pinch-out.

Figure 10:
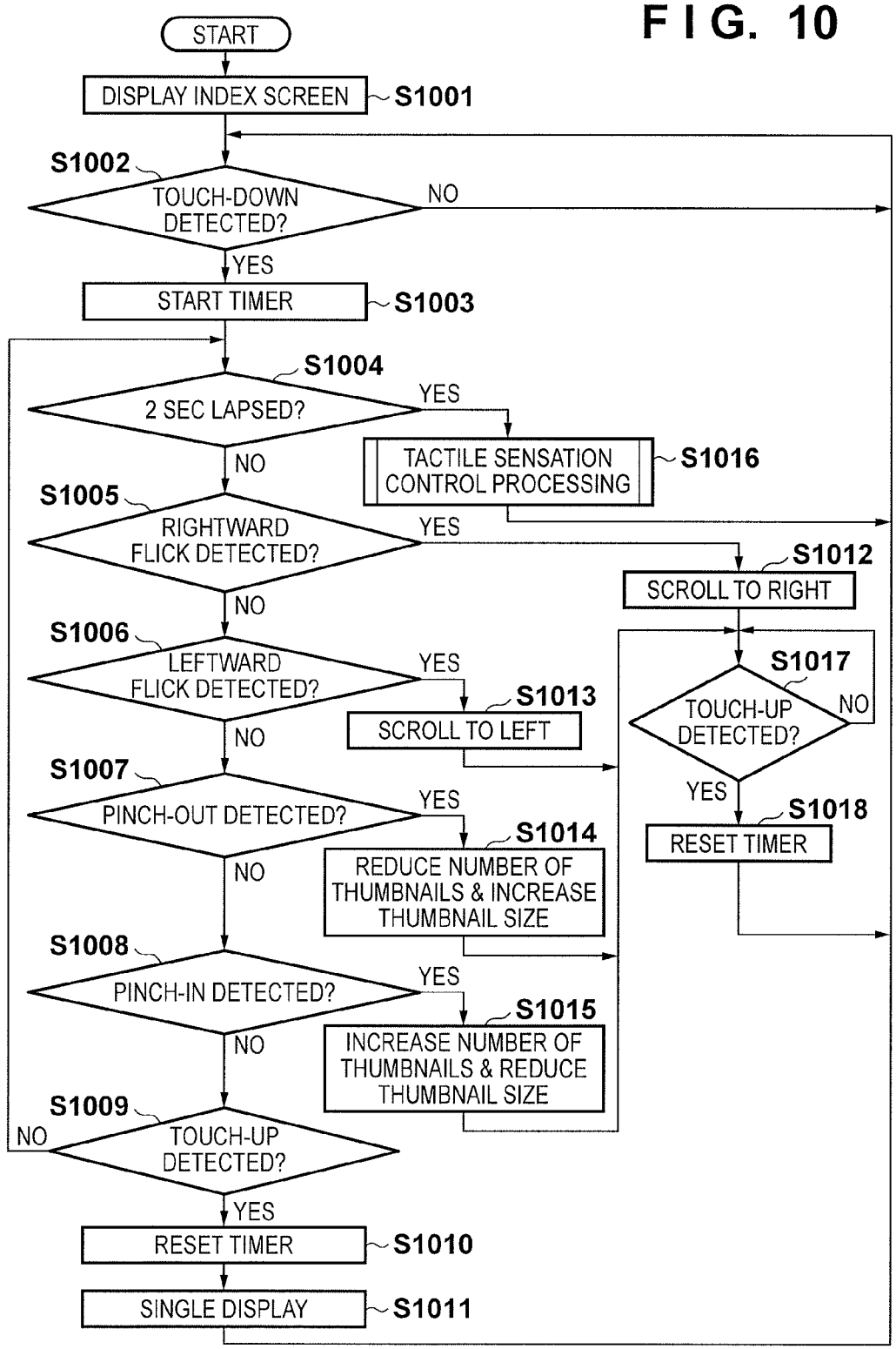
FIG. 10 is a flowchart for illustrating processing by a CPU in relation to a touch operation on an electronic device according to a second embodiment of the present invention.

These screen transition operations that depend on touch operations accepted on the index screen will be described using the flowchart shown in FIG. 10.

At S1001, the CPU 101 displays an index screen on the display 105 (FIG. 9A) by reading out image data saved in the recording medium 108, converting the read out image data to thumbnails with the image processing unit 104, and laying out the thumbnails with data saved in the nonvolatile memory 103.

At S1002, the CPU 101 waits for a touch-down state to be detected, and advances the processing to S1003 when a touch-down state is detected.

At S1003, the CPU 101 starts the system timer 112, in order to measure the duration of the touch-down state. Note that in the case where the system timer 112 is always operating, counting of the output value of the system timer 112 is started.

At S1004, the CPU 101 discriminates whether a predetermined time period (here, 2 sec) has lapsed from when time measurement was started, and advances the processing to S1016 if 2 seconds or more have lapsed and to S1005 if 2 seconds have not lapsed. The processing transitions to S1016 in the case where a leftward or rightward flick operation, a pinch-in operation, a pinch-out operation and a touch-up state are not detected for 2 seconds or more after the touch-down state was detected. In S1016, the CPU 101 performs tactile sensation control processing. Details of the tactile sensation control processing will be discussed later.

At S1005, the CPU 101 discriminates whether a rightward flick state has been detected, and, if detected, advances the processing to S1012 and scrolls display of the index screen to the right. Note that, in the present embodiment, the index screen is displayed with the thumbnails arranged in chronological order (e.g., according to shooting date and time, etc.), and scrolling display to the right is assumed to be in a direction going back in time. Accordingly, by scrolling display to the right, thumbnails of image data having an earlier shooting date and time than the thumbnails displayed in FIG. 9A are displayed on the index screen shown in FIG. 9B. The CPU 101 then advances the processing to S1017.

In the case where a rightward flick operation is not detected at S1005, the CPU 101 advances the processing to S1006, and advances the processing to S1013 in the case where a leftward flick operation is detected. At S1013, the CPU 101 scrolls display of the index screen to the left. By scrolling display to the left, thumbnails of image data having a more recent shooting date and time than the thumbnails displayed in FIG. 9A are displayed on the index screen shown in FIG. 9C. The CPU 101 then advances the processing to S1017.

In the case where a leftward flick operation is not detected at S1006, the CPU 101 advances the processing to S1007 and discriminates whether a pinch-out operation has been detected. The CPU 101 advances the processing to S1014 if a pinch-out operation is detected and to S1008 if a pinch-out operation is not detected.

Figure 9D:
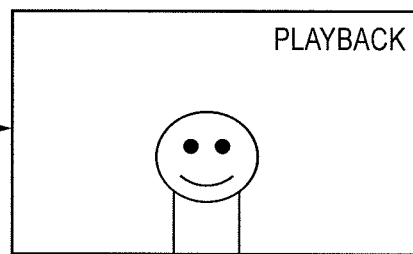
Figure 9E:
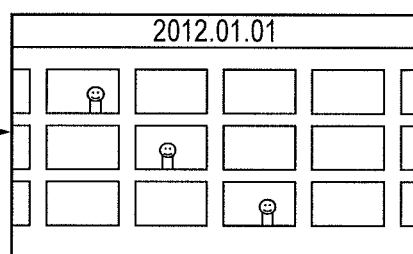
Figure 9F:
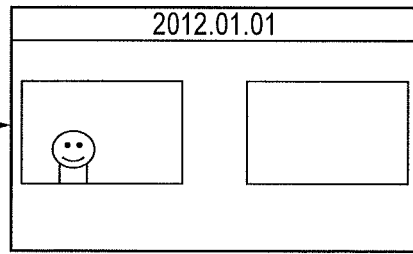

At S1014, the CPU 101 enlarges the thumbnails on the index screen by a magnification that depends on the increase in distance between the two points of the pinch-out operation, and performs display with a reduced number of thumbnails per screen. FIG. 9F shows an exemplary display of an index screen at the time of a pinch-out operation. The CPU 101 then advances the processing to S1017.

In the case where a pinch-out operation is not detected at S1007, the CPU 101 advances the processing to S1008 and discriminates whether a pinch-in operation has been detected. The CPU 101 advances the processing to S1015 if a pinch-in operation is detected and to S1009 if a pinch-in operation is not detected.

At S1015, the CPU 101 reduces the thumbnails on the index screen by a magnification that depends on the reduction in distance between the two points of the pinch-in operation, and performs display with an increased number of thumbnails per screen. FIG. 9E shows exemplary display of the index screen at the time of a pinch-in operation. The CPU 101 then advances the processing to S1017.

At S1017, the CPU 101 waits for detection of a touch-up, and advances the processing to S1018 when a touch-up is detected. At S1018, the CPU 101 stops the system timer 112 or the counting operation thereof started at S1003, and resets the timer (stops the timer after resetting it to 0). The CPU 101 then repeats the processing from S1002.

In the case where a rightward or leftward flick operation, a pinch-out operation and a pinch-in operation are not detected at S1005 to S1008, the CPU 101 discriminates whether a touch-up was detected at S1009 and advances the processing to S1010 when a touch-up is detected. If a touch-up is not detected, the CPU 101 returns the processing to S1004.

At S1010, the CPU 101 stops the system timer 112 or the counting operation thereof started at S1003, and resets the timer (stops the timer after resetting it to 0). In this case, assuming that a tap operation is detected, the CPU 101 advances the processing to S1011, and performs single display in which only the thumbnail corresponding to the tap position is enlarged and displayed on the index screen. An exemplary single display is shown in FIG. 9D. The CPU 101 then repeats the processing from S1002.

Figure 11:
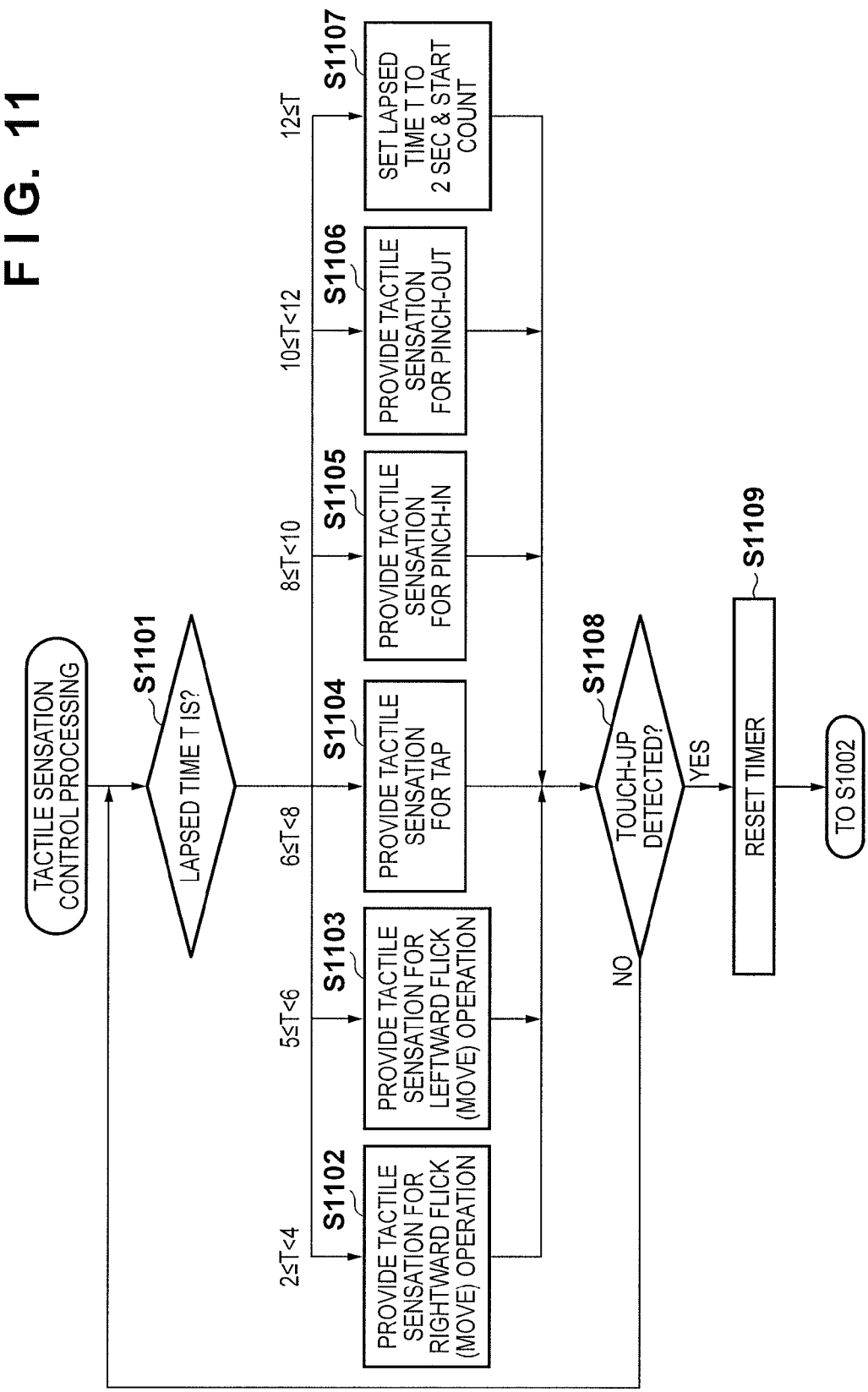
FIG. 11 is a flowchart for illustrating details of tactile sensation control processing in S1016 of FIG. 10.

Next, details of the tactile sensation control processing in S1016 of FIG. 10 will be described using the flowchart shown in FIG. 11. At S1101, the CPU 101 branches the processing according to the lapsed time T (sec) from when measurement was started at S1003.

In the case where the lapsed time T is 2 seconds or more and less than 4 seconds, the CPU 101 advances the processing to S1102 and controls the haptic feedback generator 113 so as to provide a tactile sensation corresponding to a rightward flick operation to the position where the touch-on was detected. The CPU 101 then advances the processing to S1108.

In the case where the lapsed time T is 4 seconds or more and less than 6 seconds, the CPU 101 advances the processing to S1103 and controls the haptic feedback generator 113 so as to provide a tactile sensation corresponding to a leftward flick operation to the position where the touch-on was detected. The CPU 101 then advances the processing to S1108.

In the case where the lapsed time T is 6 seconds or more and less than 8 seconds, the CPU 101 advances the processing to S1104 and controls the haptic feedback generator 113 so as to provide a tactile sensation corresponding to a tap operation to the position where the touch-on was detected. The CPU 101 then advances the processing to S1108.

In the case where the lapsed time T is 8 seconds or more and less than 10 seconds, the CPU 101 advances the processing to S1105 and controls the haptic feedback generator 113 so as to provide a tactile sensation corresponding to a pinch-in operation to the position where the touch-on was detected. The CPU 101 then advances the processing to S1108.

In the case where the lapsed time T is 10 seconds or more and less than 12 seconds, the CPU 101 advances the processing to S1106 and controls the haptic feedback generator 113 so as to provide a tactile sensation corresponding to a pinch-out operation to the position where the touch-on was detected. The CPU 101 then advances the processing to S1108.

In the case where the lapsed time T is 12 seconds or more, the CPU 101 advances the processing to S1107, sets the lapsed time T to 2 seconds, and advances the processing to S1108.

At S1108, the CPU 101 discriminates whether a touch-up was detected, and performs processing from S1101 again if a touch-up is not detected. If a touch-up is detected, the CPU 101 advances the processing to S1109 and stops the system timer 112 or the counting operation, resets the timer (stops the timer after resetting it to 0), and transitions the processing to S1002.

Thus, according to the present embodiment, the CPU 101 controls the haptic feedback generator 113 so as to sequentially generate tactile sensations indicating a plurality of touch operations that are acceptable on the screen currently being displayed, according to the duration of the touch-on state. Thus, in the case where the user does not remember or does not know the available touch operations, it is possible for the user to find out all of the plurality of touch operations that are currently available by maintaining the state of touching the touch panel (e.g., the same place thereof) with a finger. Also, since notification by a tactile sensation is repeated until a touch-up is detected, usability is improved since the user need only continue touching the touch panel without touching up in the case where there was a touch operation that he or she was not able to comprehend clearly when notified for the first time.

Third Embodiment

Next, a third embodiment of the present invention will be described. In the present embodiment, the timing for performing notification by a tactile sensation is different from the first and second embodiments. In the first and second embodiments, a tactile sensation corresponding to an acceptable touch operation is generated in response to a predetermined time period having lapsed without a touch-up and an acceptable touch operation being detected after detection of a touch-down. In the present embodiment, notification by a tactile sensation is performed when a touch-down state is next detected, in the case where an operation input by the user is not detected for a predetermined time period, rather than based on lapsed time from detection of a touch-down. Note that in order to facilitate description and understanding, the functional configuration of the electronic device according to the present embodiment and the correspondence relationship between touch operations and tactile sensations are assumed to be similar to the first and second embodiments.

Here, in order to facilitate understanding and description, operations for notifying an operation in the present embodiment will be described by taking operations by the CPU 101 of the electronic device 100 of the present embodiment after the index screen (FIG. 9A) described in the second embodiment is displayed as an example.

Figure 12:
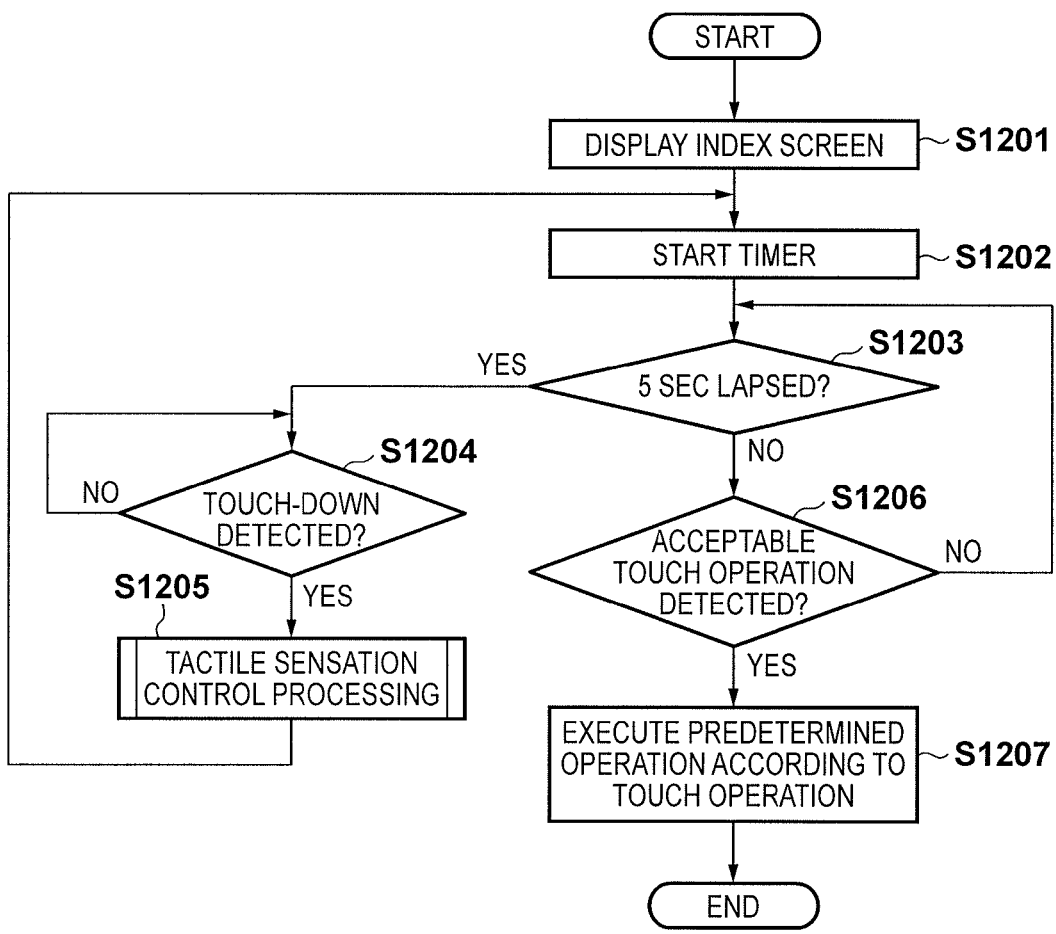
FIG. 12 is a flowchart for illustrating processing by a CPU in relation to a touch operation in an electronic device according to a third embodiment of the present invention.

FIG. 12 is a flowchart for illustrating operations for notifying an operation in the electronic device 100 of the present embodiment.

At S1201, the CPU 101 reads out image data saved in the recording medium 108, converts the read out image data to thumbnails with the image processing unit 104, and displays the thumbnails on the display 105 together with data saved in the nonvolatile memory 103 (FIG. 9A).

At S1202, the CPU 101 starts the system timer 112. Note that in the case where the system timer 112 is always operating, counting of the output value of the system timer 112 is started.

At S1203, the CPU 101 discriminates whether a predetermined time period (here, 5 sec) has lapsed from when the system timer 112 started, and advances the processing to S1204 if 5 seconds or more have lapsed and to S1206 if 5 seconds have not lapsed.

At S1204, the CPU 101 discriminates whether a touch-down state has been detected. In the case where a touch-down state is not detected, the CPU 101 waits until a touch-down state is detected. In the case where a touch-down state is detected, the CPU 101 performs tactile sensation control processing at S1205. This tactile sensation control processing may be the same as that described using FIG. 11. If there is one acceptable touch operation, the processing can advance directly to S1109, after notification by a tactile sensation has been performed at S1102.

At S1206, the CPU 101 discriminates whether an acceptable touch operation has been detected, and, if detected, executes operations that depend on the detected touch operation at S1207. The operations referred to here are as described using FIG. 10. Note that single display is performed in the case of a tap operation. On the other hand, in the case where an acceptable touch operation is not detected, the CPU 101 returns the processing to S1203.

According to the present embodiment, an acceptable touch operation is notified by a tactile sensation when touching of the touch panel (touch-down) is detected after a given time period has lapsed from when the GUI screen was displayed without an acceptable touch operation being detected. On the other hand, notification by a tactile sensation is not performed, even when touching of the touch panel is detected before the given time period has lapsed. Since a user who performs a touch operation within a relatively short time period after display of a GUI screen is considered to be aware of the acceptable touch operations, operations by an experienced user after a GUI screen has been displayed is not hindered by not performing notification by a tactile sensation. On the other hand, since it is sufficiently conceivable that a user who does not perform an operation within a predetermined time period after display of a GUI screen is unfamiliar with the acceptable touch operations, notification relating to a touch operation is performed when a touch-down is detected.

Fourth Embodiment

Next, a fourth embodiment of the present invention will be described. In the present embodiment, processing in the case where a touch operation is detected before a given time period has lapsed after display of a GUI screen but the touch operation is not acceptable is added to the third embodiment.

In the present embodiment, in such a case, notification by a tactile sensation is performed when a touch-down state is next detected, assuming that the user either does not know the acceptable touch operation or has performed a mistaken touch operation. Note that in order to facilitate description and understanding, the functional configuration of an electronic device according to the present embodiment and the correspondence relationship between touch operations and tactile sensations are assumed to be similar to the first and second embodiments.

FIG. 13 is a flowchart for illustrating operations for notifying an operation in the electronic device 100 of the present embodiment. Note that common reference numerals are given to processing that is similar to FIG. 12 and description thereof will be omitted, with description being limited to processing that differs from FIG. 12.

At S1303, the CPU 101 discriminates whether a mistake flag is ON, and, if the mistake flag is ON, advances the processing to S1204 after setting the mistake flag to OFF at S1305.

If the mistake flag is OFF in S1303, the processing advances to S1203.

At S1203, the CPU 101 discriminates whether a predetermined time period (here, 5 sec) has lapsed after the system timer 112 was started, and advances the processing to S1204 if 5 seconds or more have lapsed and to S1308 if 5 seconds have not lapsed.

At S1308, the CPU 101 discriminates whether a touch operation has been detected, and, if detected, discriminates at S1309 whether the detected touch operation is an acceptable touch operation (whether the touch operation is an available touch operation that is functional on the displayed GUI screen). If the touch operation is correct but is not available on the GUI screen being displayed (e.g., rotate operation during display of an index screen), the CPU 101 advances the processing to S1310 and sets the mistake flag to ON. Furthermore, the CPU 101 resets the timer at S1311 and returns the processing to S1202.

The processing thereby transitions from S1303 to S1305, and tactile sensation control processing is performed at S1205 in the case where a touch-down state is next detected, similarly to the case where it is discriminated at S1203 that 5 seconds or more have lapsed.

According to the present embodiment, notification by a tactile sensation is also performed when a touch-down state is next detected in the case where the touch operation detected before a given time period has lapsed after a GUI screen has been displayed is unacceptable, in addition to the case where the given time period has lapsed without detecting an acceptable touch operation. Thus, the effect of being able to notify the correct input method to the user who performed the erroneous touch operation at the time of the next input without waiting for the predetermined time period to lapse is obtained, in addition to the effects of the third embodiment.

Other Embodiments

Note that the control described as being performed by the CPU 101 in the abovementioned embodiments may be performed by one CPU or may be realized by a plurality of CPUs sharing the processing.

Also, each of the abovementioned embodiments merely illustrates one embodiment of the present invention, and these embodiments may be combined as appropriate.

Also, although the case where the present invention is applied to an electronic device was described as an example in the abovementioned embodiments, the present invention is applicable to any apparatus having a user interface that uses a touch panel. Non-limiting examples of electronic devices to which the present invention is applicable include the following: personal computers, PDAs, mobile phones, portable image viewers, printer apparatuses provided with a display, digital photo frames, music players, game machines, electronic book readers and the like having a touchpad.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-109388, filed on May 23, 2013, which is hereby incorporated by reference herein its entirety.

What is claimed is:

1. An electronic device comprising:
a detecting unit configured to detect a touch operation on an input device, wherein a touch operation is defined as a specific series of changes of touch state of the input device;
a processing unit configured to perform processing that depends on the touch operation detected by the detecting unit;
a generating unit configured to notify the user of an available touch operation that is detectable by the detecting unit among a plurality of touch operations that are detectable by the detecting unit, by generating stimulation that is perceivable by the user who is touching the input device through a portion that is being touched; and
a control unit configured to control the generating unit so as to generate stimulation corresponding to the available touch operation that is detectable by the detecting unit.

2. The electronic device according to claim 1,
wherein the control unit controls the generating unit so as to generate stimulation corresponding to the available touch operation that depends on an operational state of the electronic device, among the plurality of touch operations that are detectable by the detecting unit.

3. The electronic device according to claim 2,
wherein in a case where there are a plurality of available touch operations, the control unit controls the generating unit so as to sequentially generate stimulation corresponding to each of the available touch operations.

4. The electronic device according to claim 2,
wherein the control unit controls the generating unit so as to generate same stimulation for different operational states of which an available touch operation is same.

5. The electronic device according to claim 1,
wherein the control unit controls the generating unit so as to generate stimulation corresponding to a touch operation that will be detectable by the detecting unit after a touch operation currently being performed ends.

6. The electronic device according to claim 1, further comprising display unit,
wherein the input device is provided in the display unit.

7. The electronic device according to claim 1,
wherein the control unit performs the control of the generating unit if a touch operation on the input device meets a predetermined condition.

8. The electronic device according to claim 7,
wherein the control unit performs the control of the generating unit if a touch operation that is detectable by the detecting unit is not performed before a predetermined time period has lapsed from when touching of the input device is detected.

9. The electronic device according to claim 7,
wherein the control unit performs the control of the generating unit if an unavailable touch operation is performed on the input device.

10. The electronic device according to claim 1,
wherein a touch operation that is detectable by the detecting unit includes at least one of a tap, a flick, a pinch-in, a pinch-out, a double tap, a rotate, and a drag.

11. The electronic device according to claim 1,
wherein the generating unit is capable of generating stimulation at a position of a portion of a touch-sensitive surface of the input device, and
the control unit performs control of the generating unit so as to generate stimulation of which position moves in different movement patterns depending on the available touch operation.

12. The electronic device according to claim 11,
wherein the control unit controls the generating unit so as to generate, as stimulation corresponding to a flick operation in a specific direction as a touch operation that is detectable by the detecting unit, local stimulation that moves in the specific direction with respect to the touch-sensitive surface.

13. The electronic device according to claim 1,
wherein the stimulation is vibration stimulation.

14. The electronic device according to claim 1,
wherein the stimulation is electrical stimulation.

15. A method of controlling an electronic device having a generating unit configured to generate stimulation that is perceivable by a user who is touching an input device through a portion that is being touched, comprising the steps of:
detecting a touch operation on the input device, wherein a touch operation is defined as a specific series of changes of touch state of the input device;
performing processing that depends on the touch operation detected in the detecting step; and
controlling the generating unit so as to generate stimulation corresponding to an available touch operation that is detectable in the detecting step to notify the user of the available touch operation that is detectable by the detecting unit among a plurality of touch operations that are detectable by the detecting unit.

* * * * *